(12) United States Patent
Crevier

(10) Patent No.: US 6,743,330 B2
(45) Date of Patent: Jun. 1, 2004

(54) METHOD AND APPARATUS FOR FORMING SLIDER END STOPS ON ZIPPER

(75) Inventor: Donald L. Crevier, Essex, IL (US)

(73) Assignee: Illinois Tool Works Inc., Glenview, IL (US)

(*) Notice: Subject to any disclaimer, the term of this patent is extended or adjusted under 35 U.S.C. 154(b) by 78 days.

(21) Appl. No.: 10/150,714

(22) Filed: May 17, 2002

(65) Prior Publication Data

US 2003/0213830 A1 Nov. 20, 2003

(51) Int. Cl.⁷ ............................................. B29C 65/08
(52) U.S. Cl. .................. 156/580.2; 156/73.1; 156/73.3; 156/522; 156/580.1; 156/580.2
(58) Field of Search ............................... 156/73.1, 73.3, 156/522, 580.1, 580.2, 581, 583.1; 228/1.1, 110.1

(56) References Cited

U.S. PATENT DOCUMENTS

| | | | | |
|---|---|---|---|---|
| 4,403,465 A | * | 9/1983 | Bachner ..................... | 53/477 |
| 5,088,971 A | | 2/1992 | Herrington ................. | 493/203 |
| 5,421,923 A | * | 6/1995 | Clarke et al. .............. | 156/73.1 |
| 5,890,347 A | * | 4/1999 | Giacomelli et al. ........... | 53/477 |
| 5,950,285 A | | 9/1999 | Porchia et al. ................ | 24/400 |
| 5,976,315 A | * | 11/1999 | Martin ..................... | 156/580.2 |
| 6,036,796 A | | 3/2000 | Halbert et al. ................ | 156/64 |
| 6,287,001 B1 | | 9/2001 | Buchman ..................... | 383/64 |
| 6,357,914 B1 | | 3/2002 | Kinigakis et al. ............. | 383/64 |

* cited by examiner

Primary Examiner—James Sells
(74) Attorney, Agent, or Firm—Ostrager Chong & Flaherty LLP

(57) ABSTRACT

A method and a system for forming slider end stops on a zipper tape that comprises first and second interlockable zipper parts. The method comprises the following steps: (a) transmitting sufficient ultrasonic wave energy into first and second areas of the zipper tape to cause the first and second interlocked zipper parts to deform and fuse in the first and second areas, the first and second areas being separated by a gap; and (b) applying sufficient heat and pressure onto a third area of the zipper tape to cause the interlocked zipper parts to deform and fuse in the third area, at least part of the third area being located between the first and second areas in the gap. The first and second areas do not impinge upon the zipper rails. The third area does impinge upon the zipper rails. Thus the zipper rails are deformed in the third area, but not in adjacent areas located below and contiguous with the first and second areas. The zipper tape and packaging film are cut along a midline of the third area to sever each package from the continuous web.

15 Claims, 7 Drawing Sheets

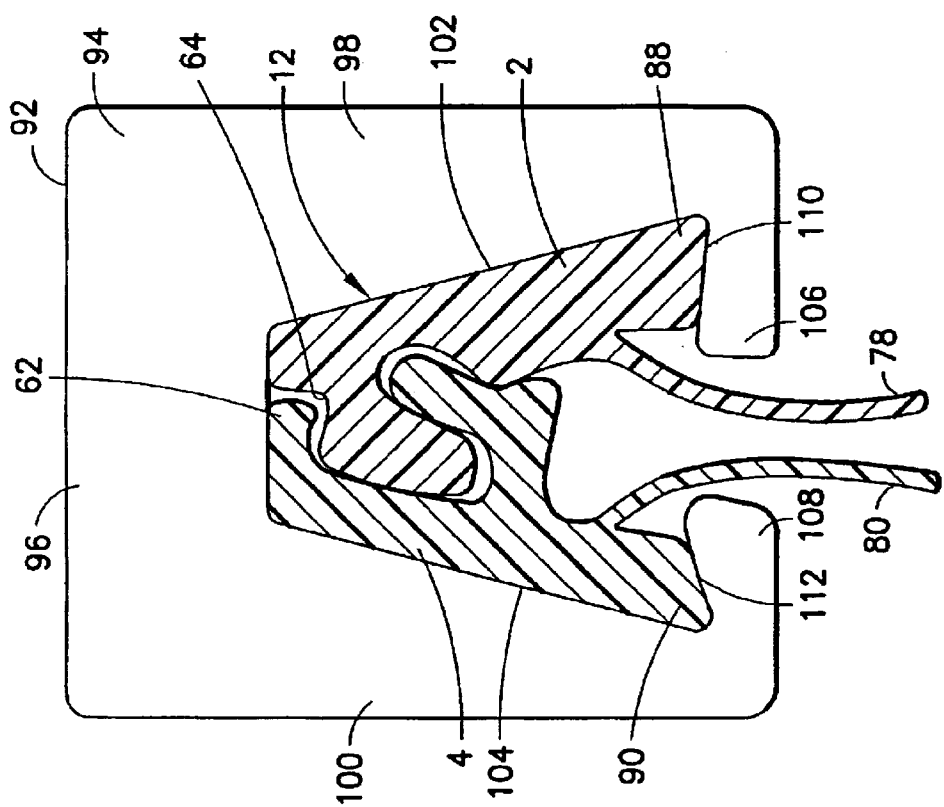

METHOD AND APPARATUS FOR FORMING SLIDER END STOPS ON ZIPPER

BACKGROUND OF THE INVENTION

This invention generally relates to methods and apparatus for manufacturing slider-operated flexible zippers for use in reclosable pouches, bags or other packages of the type in which perishable material, such as foodstuff, are stored.

Reclosable fastener assemblies are useful for sealing thermoplastic pouches or bags. Such fastener assemblies often include a plastic zipper and a slider. Typically, the plastic zippers include a pair of interlockable fastener elements, or profiles, that form a closure. As the slider moves across the profiles, the profiles are opened or closed. The profiles in plastic zippers can take on various configurations, e.g. interlocking rib and groove elements having so-called male and female profiles, interlocking alternating hook-shaped closure elements, etc.

Conventional slider-operated zipper assemblies typically comprise a plastic zipper having two interlocking profiles and a slider for opening and closing the zipper. In one type of slider-operated zipper assembly, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction.

Other types of slider-operated zipper assemblies avoid the use of a separating finger. For example, U.S. Pat. No. 6,047,450 discloses a zipper comprising a pair of mutually interlockable profiled structures. The first profiled structure comprises an interlocking element on a surface directed toward the second profiled structure and an integral base directed away from the second profiled structure. Likewise, the second profiled structure comprises an interlocking element on a surface directed toward the first profiled structure and an integral base directed away from the first profiled structure. Additionally, portions of the two profiled structures form a fulcrum about which the profiled structures may be pivoted out of engagement when lower edges of the bases are forced towards each other.

One of the important features of such reclosable fastener assemblies are the end stops, which prevent the slider from falling off the end of the fastener when the slider reaches the end of the fastener. End stops have taken on various configurations, such as, for example, riveted end clamps such as those described in U.S. Pat. Nos. 5,067,208 and 5,161,286; transverse end stops made from molten material of the fastener strips, as described in U.S. Pat. No. 5,088,971; reciprocating anvils, as described in U.S. Pat. No. 5,131,121; tubular end stops, as described in U.S. Pat. No. 5,405,478; a window structure combined with sealed zipper ends, as described in U.S. Pat. No. 5,442,837; or plastic end clips fused to the zipper as described in U.S. Pat. No. 5,448,807.

U.S. Pat. No. 5,950,285 discloses a reclosable bag having end stops that prevent a slider from moving beyond the end of the zipper when the slider reaches either the closed or fully open position. The end stops are formed from the material of the zipper profiles and "rise vertically" from the zipper to block and prevent further movement of the slider. The end stops are formed by first aligning together the opposing profiles at an end stop area proximate to an end of the bag, and then fusing the zipper profiles at the end stop area to provide a vertical structure for preventing movement of the slider past the ends of the zipper, while at the same time keeping the lower corners or rails of the zipper parts intact. Preferably, the profiles are fused by directing ultrasonic energy to the end stop area.

Consumers are provided with bulk quantities of various commodities, such as food products, that are marketed in reclosable packages having slider-operated zippers. Form/fill/seal machines are used to form a reclosable package having an opening for filling with product, filling the formed package with product and then sealing the opening to form the final product. Automated production lines using form/fill/seal machines of many different types are prevalent. Naturally, the production capacity of any facility is a function of the speed of the production line. Thus there is a constant need for innovations that will speed up the production line. Manufacturers of food products and other commodities are concerned with forming, filling and sealing a reclosable package as quickly and economically as possible.

Although improvements have been made in the art of plastic welding and joining, manufacturers of consumer products employing high-speed production techniques are continually seeking improved package forming methods and equipment. One area in which improvements in productivity have been sought is in the formation of the end stop that limits the travel of a slider or clip traveling along tracks or rails of a zipper or fastener. Any reduction in the time needed to form these and other package features can result in substantial cost savings.

In the past, heat conduction and ultrasonic sealing techniques have been used to deform or crush the end sections of a zipper into shapes capable of serving as slider end stops. More recently, slider end stops have been sculpted using ultrasonic sealing or welding techniques, which afford improved control over the size and shape of the end stops as compared to the results attainable using conduction heat sealing.

From a manufacturing standpoint, it is desirable to reduce the dwell time involved to melt and shape the end stop, thereby enhancing the overall efficiency of the package manufacturer. The larger the mass of thermoplastic zipper material that needs to be melted and shaped, the longer the dwell time of the package during the ultrasonic stomping operation. A longer dwell time during ultrasonic stomping in turn can reduce the speed of the form/fill/seal machine. Thus there is a need for innovations directed to speeding up the operation of ultrasonically stomping slider end stops on zippers.

BRIEF DESCRIPTION OF THE INVENTION

The invention is directed to a method and an apparatus for ultrasonically stomping slider end stops on flexible zipper structures.

One aspect of the invention is an ultrasonic welding assembly comprising a horn and an anvil, wherein the horn comprises two prongs separated by a gap. Each prong comprises an end surface confronting the anvil, each end surface having at least a portion that is flat, the flat portions being generally coplanar.

Another aspect of the invention is a method for forming slider end stops on a zipper tape that comprises first and second interlockable zipper parts, the method comprising the following steps: (a) transmitting sufficient ultrasonic wave energy into first and second areas of the zipper tape to cause the first and second interlocked zipper parts to deform and fuse in the first and second areas, the first and second areas being separated by a gap; and (b) applying sufficient heat and pressure onto a third area of the zipper tape to cause the interlocked zipper parts to deform and fuse in the third area, at least part of the third area being located between the first and second areas in the gap.

Yet another aspect of the invention is a system for forming slider end stops on a zipper tape that comprises first and second interlockable zipper parts, the system comprising: an ultrasonic welding apparatus configured to transmit sufficient ultrasonic wave energy into first and second areas of the zipper tape to cause the first and second interlocked zipper parts to deform and fuse in the first and second areas, the first and second areas being separated by a gap; and a conduction heat sealing apparatus configured to apply sufficient heat and pressure onto a third area of the zipper tape to cause the interlocked zipper parts to deform and fuse in the third area, at least part of the third area being located between the first and second areas in the gap.

A further aspect of the invention is a method for forming slider end stops, comprising the following steps: advancing a web of packaging film material having a zipper tape joined thereto to a first station; at the first station, ultrasonically stomping the zipper tape in first and second areas, the first and second areas being separated by a gap; advancing the web by one package width in a lengthwise direction of the zipper tape so that the gap is in register with a second station; and at the second station, conduction heat sealing in a third area that lies at least partly in the gap between the first and second areas and includes a contiguous strip that extends generally transverse to the lengthwise direction, a portion of the zipper tape within the third area being deformed and portions of the packaging film material within the third area being joined to form a seal having a predetermined width.

Yet another aspect of the invention is a system for forming packages having slider-operated zippers, comprising first and second stations having respective registration points spaced at a distance equal to one or more package widths along a machine direction, wherein the first station comprises an ultrasonic welding apparatus configured to ultrasonically stomp a zipper tape in first and second areas spaced in the machine direction, the first and second areas being separated by a gap; and the second station comprises conduction heat sealing apparatus configured to heat seal packaging film material in a third area that lies at least partly in the gap between the first and second areas and includes a contiguous strip that extends generally transverse to the machine direction, a portion of the zipper tape within the third area being deformed and portions of the packaging film material within the third area being joined to form a seal having a predetermined width.

Other aspects of the invention are disclosed and claimed below.

BRIEF DESCRIPTION OF THE DRAWINGS

FIG. 2 is a cross-sectional view of an interlocked zipper of a known slider-operated plastic zipper having no separating finger.

FIG. 3 is the same view as presented in FIG. 2, except that a slider has been mounted to the interlocked zipper.

DETAILED DESCRIPTION OF THE INVENTION

Figure 1:
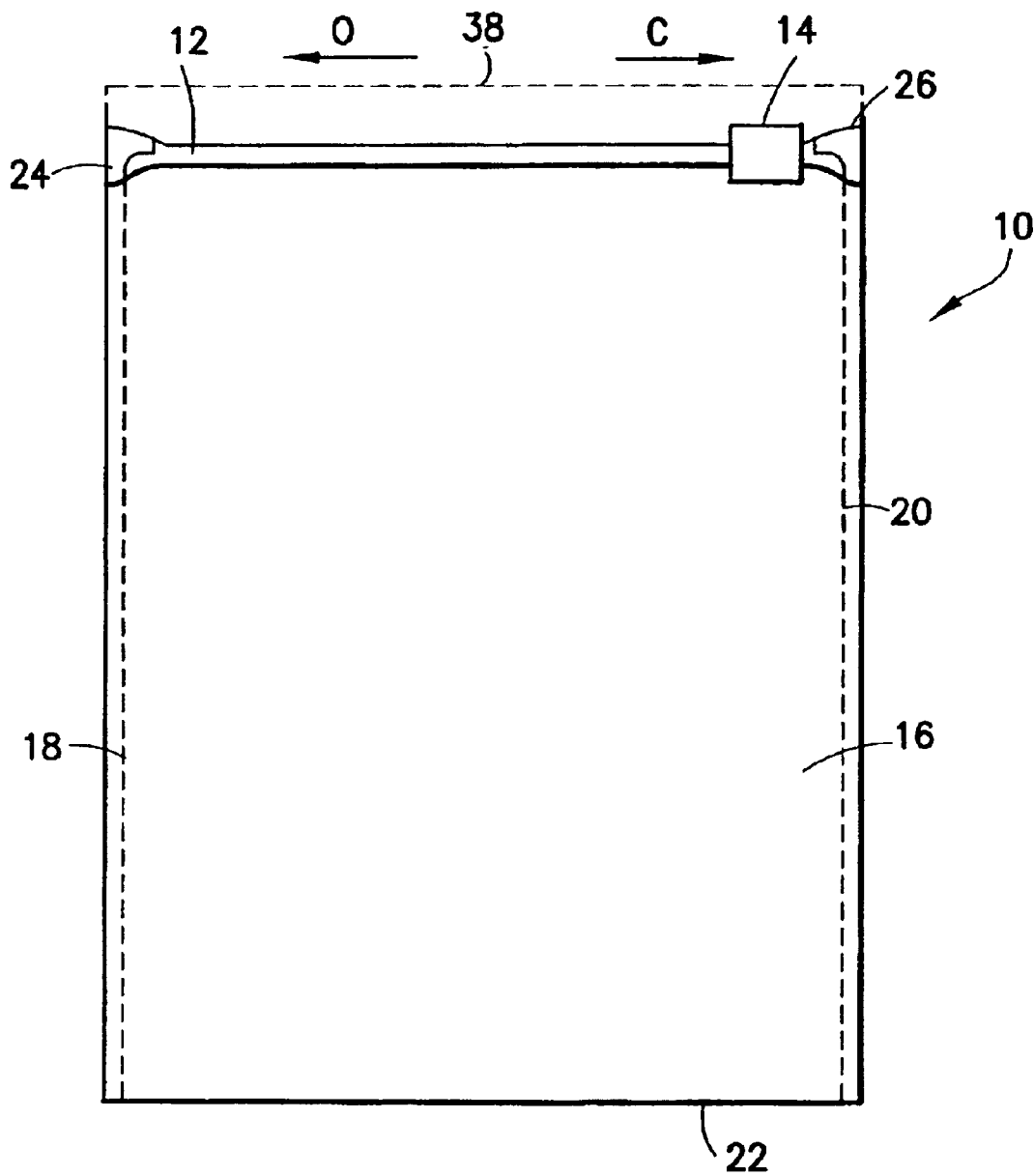
FIG. 1 is a schematic showing a reclosable package having a slider-operated zipper with ultrasonically stomped end stops.

Reference will now be made to the drawings, in which similar elements in different drawings bear the same reference numerals. A reclosable package or bag 10, having a flexible plastic zipper 12 operated by manipulation of a slider 14 and having stomped slider end stops 24 and 26, is shown in FIG. 1. This type of reclosable package is disclosed in U.S. patent application Ser. No. 10/113,489 filed on Apr. 1, 2002 and entitled "Method and Apparatus for Ultrasonically Stomping Slider End Stops on Zippers". The bag 10 may be made from any suitable sheet material or plastic film and comprises opposing wall panels (only the front panel 16 is visible in FIG. 1), which may be secured together at opposite side edges of the bag by seams 18 and 20 (indicated by dashed lines). The opposing bottoms of the wall panels may be joined, for example, by means of a seal made in conventional fashion, e.g., by conduction heat sealing. Typically, however, the bottom of the package is formed by a fold 22 in the original packaging film, as seen in FIG. 1.

Figure 8:
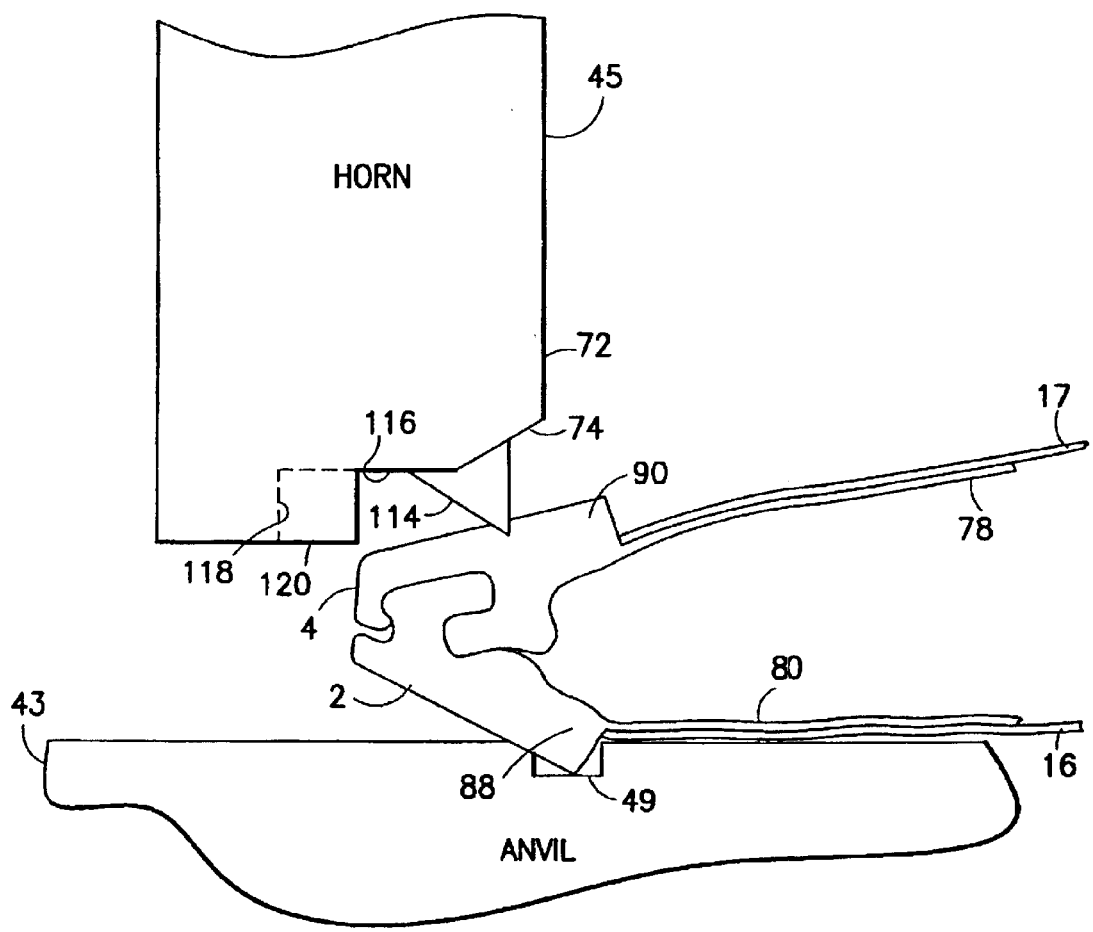
FIG. 8 is a schematic showing an elevational view of a zipper sandwiched between a horn and an anvil at the start of ultrasonic stomping in accordance with one embodiment of the invention.

At its top end, the bag 10 has an openable mouth, on the inside of which is an extruded plastic zipper 12. The zipper 12 comprises a pair of interlockable fastener strips or zipper halves 2 and 4 (best seen in FIG. 8). Although FIG. 8 shows a rib and groove arrangement, the profiles of the zipper halves may take any form. For example, the zipper may comprise interlocking rib and groove elements or alternating hook-shaped closure elements. The preferred zipper material is polyethylene.

The front and rear bag wall panels 16 and 17 (seen in FIG. 8) are respectively sealed to the zipper halves 2 and 4 by conduction heat sealing in conventional manner. Alternatively, the interlockable zipper halves can be attached to the wall panels by adhesive or bonding strips or the zipper profiles can be extruded integrally with the bag material. For the purpose of joinder, the zipper halves 2, 4 may be provided with respective extension flanges 80, 78, to which an upper portion of the respective bag wall panels 16, 17 are fused, adhered or welded. The walls 16, 17 of the bag may be formed of various types of thermoplastic material, such as low-density polyethylene, substantially linear copolymers of ethylene and a C3–C8 alpha-olefin, polypropylene, polyvinylidene chloride, mixtures of two or more of these polymers, or mixtures of one of these polymers with another thermoplastic polymer. The person skilled in the art will recognize that this list of suitable materials is not exhaustive. The bag material may be either transparent or opaque.

Optionally, the bag 10 may be provided with an enclosed header 38, indicated by dashed lines in FIG. 1, which encompasses the zipper and the slider prior to the package being opened. Alternatively, the header may be provided with openings on the front and rear panels at the closed position of the slider, with the openings being sized and shaped to allow the slider to protrude through the openings on both faces of the header. The header 38 may be a panel or strip formed from the same material as that comprising the walls of the package or from the same material as that comprising the zipper or from an entirely separate material. More specifically, the header may comprise a panel of thermoplastic material that is heat sealed or ultrasonically welded to either the zipper flanges or the package walls. Alternatively, the header may be formed as an extension of the zipper flanges or the package walls.

In zippered bags with sliders, as the slider moves across the zipper, the zipper is opened or closed. As shown in FIG. 1, the slider 14 is slidable along the zipper in a closing direction "C", causing the zipper halves to become engaged, or in an opening direction "O", causing the zipper halves to become disengaged.

The slider for opening or closing the reclosable zipper is generally shaped so that the slider straddles the zipper profiles. The slider may be made in multiple parts and welded together or the parts may be constructed to be snapped together. The slider may also be of one-piece construction. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

FIG. 2 shows a cross-sectional view of a known plastic zipper 12 designed for operation by a slider. The zipper 12 is preferably formed of a resilient plastic material, such as polyethylene, and comprises a first profiled zipper part 2 and a second profiled zipper part 4. The zipper 12 is disposable inside and across the mouth of the package, as shown in FIG. 1. The first profiled structure 2 comprises a male member 66 designed to interlock with the second profiled structure 4 and a relatively stiff base 68. Similarly, the second profiled structure 4 comprises a female member 70, designed to interlock with the male member 66 of the first profiled structure 2, and a relatively stiff base 72.

As is clear from FIG. 1, the outer surface of the bases 68 and 72 are not parallel, but diverge downwardly, i.e., from the top surface to the rails 88 and 90, to form a shape that resembles a letter "A" that is truncated at the top. Because of this "A" configuration, the zipper is difficult to open from the contents (i.e., product) side of the receptacle, since the opening force tends to push the lower extremities of the profiled structures apart, thereby enhancing the interlock between the male member 66 and the female member 70. The zipper 12 is sealable to the receptacle of the package at extension flanges 78 and 80.

The male profiled structure 2 also includes a convex fulcrum member 82 that engages a concave fulcrum member 84 of the female profiled structure 4 to form a fulcrum 86, as shown in FIG. 1. The fulcrum 86 is not equidistant between the bases 68 and 72, but rather is offset closer to the profiled structure 2. The surfaces of the fulcrum members 82 and 84 are contoured to form a seal between the interlocked profiled structures 2 and 4 at the fulcrum 86.

When the rails 88 and 90 are forced towards each other, the resulting leverage causes the profiled structures 2 and 4 to pivot oppositely about the fulcrum 86 and disengage from each other. The male member 66 is shaped to easily disengage from the female member 70 by said pivoting action. A top latch 62 on the female member 70 is resiliently releasable from the top cavity or indent 64 in the male member 66 to permit opening upon a force being applied to the latch 62 by an upper shoulder (not shown) on an associated slider. To ensure proper pivoting of the profiled structures 2 and 4, the bases 68 and 72 should be more rigid than the male and female members 66 and 70. This may be achieved, for example, by making the bases 68 and 72 thicker than the resilient portions of members 66 and 70.

To facilitate opening and closing of the zipper 12, the zipper 12 is provided with a straddling slider 14, as shown in FIG. 3. The slider 14 can be top-loaded onto the zipper without having to disengage the profiled structures at the loading point since the slider does not make use of a separating finger. The slider is slidable along the zipper in a closing direction, indicated by the arrow labeled "C" in FIG. 1. The profiled structures 2 and 4 are engaged, i.e., interlocked, with each other as the slider travels in the closing direction. Similarly, the slider is slidable along the zipper in an opening direction, indicated by the arrow labeled "O" in FIG. 1. The profiled structures 2 and 4 are disengaged from each other as the slider travels in the opening direction. The slider 14 is preferably made of a resilient plastic material, such as delrin, polypropylene, PBT, etc.

FIG. 3 depicts a closing end 94 of the slider 14, with the zipper 12 shown in cross section. The closing end is shaped to force the profiled structures 2 and 4 into engagement when the slider 14 travels in the closing direction. During slider travel in the closing direction, the closing end is the trailing end of the slider. As shown in FIG. 3, the slider 14 straddles the zipper 12 and has a top 96 from which a first arm 98 and a second arm 100 depend. The first arm 98 has an inner surface 102 and the second arm 100 has an inner surface 104. The slider inner surfaces 102 and 104 are divergent with respect to each other in the same manner as the zipper bases 68 and 72, and are spaced to push the profiled structures 2 and 4 into engagement as the slider 14 is moved along the zipper 12 in the closing direction. The slider arms 98 and 100 are respectively provided with retaining shoulders 106 and 108 having upper surfaces 110 and 112 that mate with the lower surfaces of the rails 88 and 90. These mating surfaces may be tapered to maximize their pull-off resistance.

Opening of the zipper 12 is achieved when the slider 14 is moved in the opening direction. Although not shown, at the opening end of the slider, the slider arms have inner surfaces that are substantially parallel, rather than divergent as at the closing end 94 (shown in FIG. 3). As the slider is moved in the opening direction and the slider arm inner surfaces change from the "A" configuration of surfaces 102 and 104 (see FIG. 3) to a substantially parallel configuration of surfaces (not shown) at the opening end of the slider, the rails 88 and 90 of the profile bases 68 and 72 are forced towards each other, thereby forcing the fulcrum members into a tighter relationship and causing the profiled structures 2 and 4 to pivot oppositely about the fulcrum 86. Simultaneously, a retaining shoulder (not shown) on the first slider arm forces the male profile upwardly, while a shoulder forces the female profile downwardly, causing the convex male fulcrum member 82 (see FIG. 2) to cam upwardly along the concave female fulcrum member 84. Thus, the resulting action is a simultaneous pivoting of the profiled structures 2 and 4 oppositely about the fulcrum 86 and an upward translation of the first profiled structure 2 relative to the second profiled structure 4, resulting in disengagement of the profiled structures. A cavity (not shown) in the slider top accommodates the upward translation of the male profiled structure 2.

The bag shown in FIG. 1 further comprises end stops 24 and 26 for preventing the slider from sliding off the end of the zipper when the slider reaches the closed or fully opened position. Such end stops perform dual functions, serving as stops to prevent the slider from going off the end of the zipper and also holding the two zipper profiles together to prevent the bag from opening in response to stresses applied to the profiles through normal use of the bag. In the areas of the end stops, the male and female profiled structures 2 and 4 are fused together and stomped into the desired end stop geometry.

Figure 4:
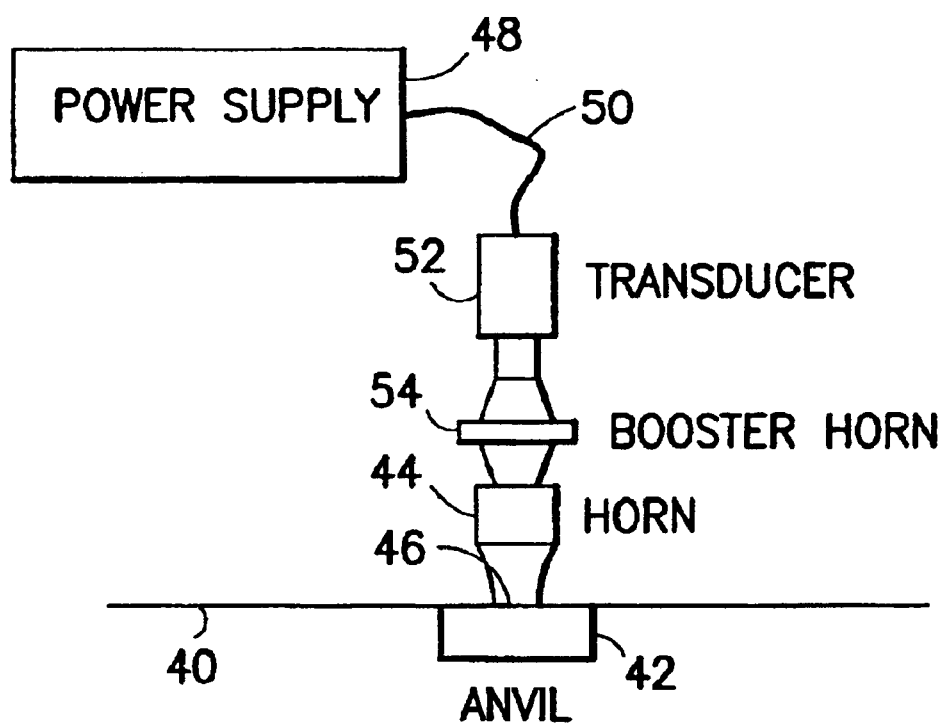
FIG. 4 is a schematic showing a typical ultrasonic welding apparatus for welding thermoplastic material.

Welding and sealing of thermoplastic material by ultrasonic vibrations is an established process and has been used for forming slider end stops on the ends of a slider-operated zipper in a reclosable package. FIG. 4 shows a typical ultrasonic welding apparatus in which a workpiece 40 is fed through an ultrasonic weld station comprising an anvil 42 and an oppositely disposed resonant horn 44. The frontal surface 46 of the horn 44 and the anvil 42 are urged toward mutual engagement by force means, not shown, for causing the horn to be in forced contact with the workpiece for coupling the ultrasonic vibrations into the material, thereby effecting ultrasonic welding. The horn 44 is energized from a power supply 48 that provides electrical high-frequency power at a predetermined ultrasonic frequency via a cable 50 to an electroacoustic transducer 52, which, in turn, provides mechanical vibrations at that frequency to a booster or coupling horn 54 for coupling these vibrations to the horn 44. The horns 44 and 54 and the transducer 52 are dimensioned to be mechanically resonant longitudinally at the predetermined frequency. This combination of components forming an ultrasonic welding apparatus is well known to those skilled in the art Reclosable packages of the type depicted in FIG. 1 can be manufactured using different methods. In accordance with one method of manufacture, package film is paid off a roll. Downstream a pull roller is provided for driving the film through the machine. A folder plow positioned downstream of the film roll folds the package film about a bottom crease (22 in FIG. 1) to form opposing package walls. Zipper tape is paid off a spool and fed between the advancing package walls. Preferably sliders are mounted to the zipper tape before the latter is joined to the packaging film material. The zipper tape is passed around a guide roller and fed in the machine direction at a predetermined height from the bottom fold in the package film. At a first sealing station, the zipper tape is sealed to the package walls by a pair of horizontal sealing bars. After this sealing operation, the packaging film is advanced one package increment (i.e., one package width). The zipper tape is then stomped at a stomping station comprising the horn and anvil described herein, thereby forming back-to-back slider end stops for two contiguous packages that have not yet been separated. After stomping, the packaging film is again advanced one package increment. Then at a second sealing station, the folded film and zipper tape are cross-sealed by a pair of vertical sealing bars to form discrete packages, the end stops stomped in the previous step overlapping and extending beyond the cross seal on opposite sides. Then the packaging film is again advanced one package increment. At a cutting station, the individual packages are severed from one another by cutting along a line that bisects the cross seal and the back-to-back end stops, thereby forming respective side seals and slider end stops on the separated packages. Each separated package is then ready to be filled. Alternatively, the packages can be filled before cutting. In summary, during a single stomping operation and a single cross sealing operation, respective slider end stops and side seals are being formed for two different packages defined by the cut.

Although the foregoing procedure is described as a series of steps performed at stations spaced at equal intervals of one package width, the person skilled in the art will readily appreciate that the stations can alternatively be spaced at intervals that are a multiple of the package width. What is important is that the centerline of the stomping horn and the centerline of the cross sealing bars be positioned relative to the blade of the cutting instrument to ensure that the stomped and cross-sealed areas will be divided, if not bisected, by the cut. For this, it is necessary that the packaging film be advanced in increments of one package width with the stomping centerline, the cross sealing centerline and the cutting line being separated by one or multiple package increments.

In accordance with one embodiment of manufacturing apparatus, a module is attached to the side of a form/fill/seal (FFS) machine. The module applies a slider to the zipper and stomps the zipper, using a horn and anvil of the type disclosed herein. These steps can be performed concurrently or in alternating sequence. Then the prepared zipper/slider assembly is fed into the FFS machine. Depending on the type of FFS machine, the zipper/slider assembly is fed either parallel (in the machine direction) or transverse (in the cross direction) to the direction of film web advancement using a registered/guided method. Then the extension flanges of the zipper halves are welded to the webs. The completed web is then cross-sealed and cut-off to form a separate package.

Figure 5:
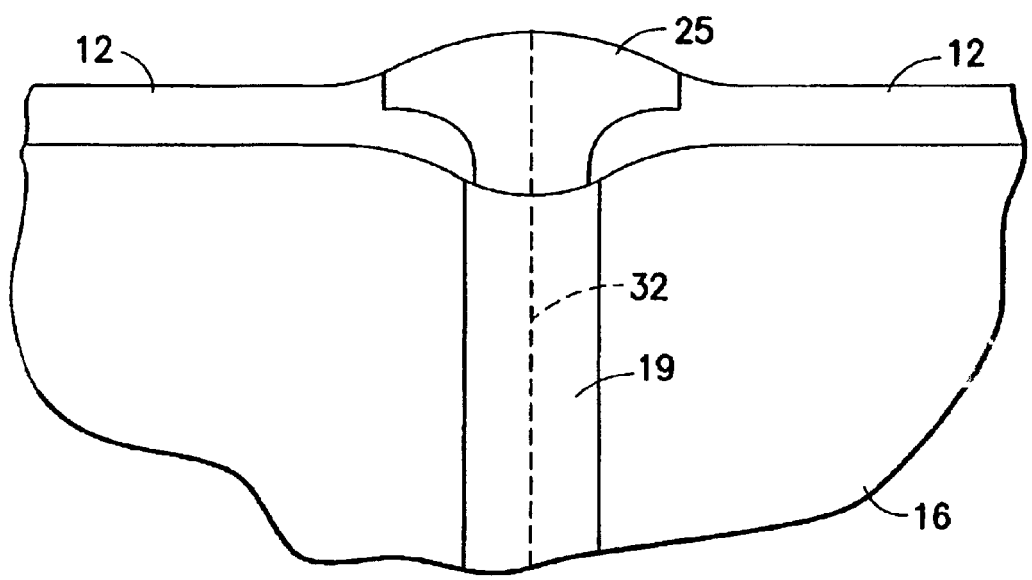
FIG. 5 is a schematic showing a plan view of a portion of an ultrasonically stomped zipper tape attached to a folded web of packaging film. The ultrasonically stomped area is T-shaped and is bisected by a dashed line indicating where the assembly will be cut to form separate packages.

FIG. 5 is a schematic showing a plan view of a portion of an ultrasonically stomped zipper tape 12 attached to a folded web of packaging film, the front panel of which is indicated by the numeral 16. Using the method described above, the ultrasonically stomped area 25 on the zipper 12 is T-shaped. After the ultrasonic deformation of the zipper, a vertical strip is conduction heat sealed to form a cross seal 19 that extends from the bottom of the ultrasonically stomped area 25 to the fold (not shown) at the bottom of the folded packaging film. Preferably a line of symmetry of the stomped region 25 is generally collinear with a centerline of the cross seal 19, which are in turn generally collinear with the line of cutting, indicated by the dashed line 32. However, precise collinearity is not required. When the zipper 12 and packaging film are cut along line 32, the package on the right-hand side of FIG. 5 will be separated from the package on the left-hand side, the stomped region 25 will be divided to form respective end stops on the respective packages (end stops 24 and 26 shown in FIG. 1), and the cross seal 19 will be divided into respective side seals on the respective packages (side seals 18 and 20 shown in FIG. 1).

The present invention is directed to reducing the dwell time for the ultrasonic stomping operation by reducing the amount of thermoplastic zipper material in the zipper end sections to be ultrasonically deformed. This is accomplished by ultrasonically stomping mirror portions of the zipper tape above the rails and distant from the point where the zipper tape will be cut and then using conduction heat sealing to crush the zipper, including rails, in the zipper section between the ultrasonically stomped portions. The result will again be a generally T-shaped crushed area which, when the zipper tape and packaging film material are cut, will form respective mirror-image slider end stops on the separated packages.

Figure 6:
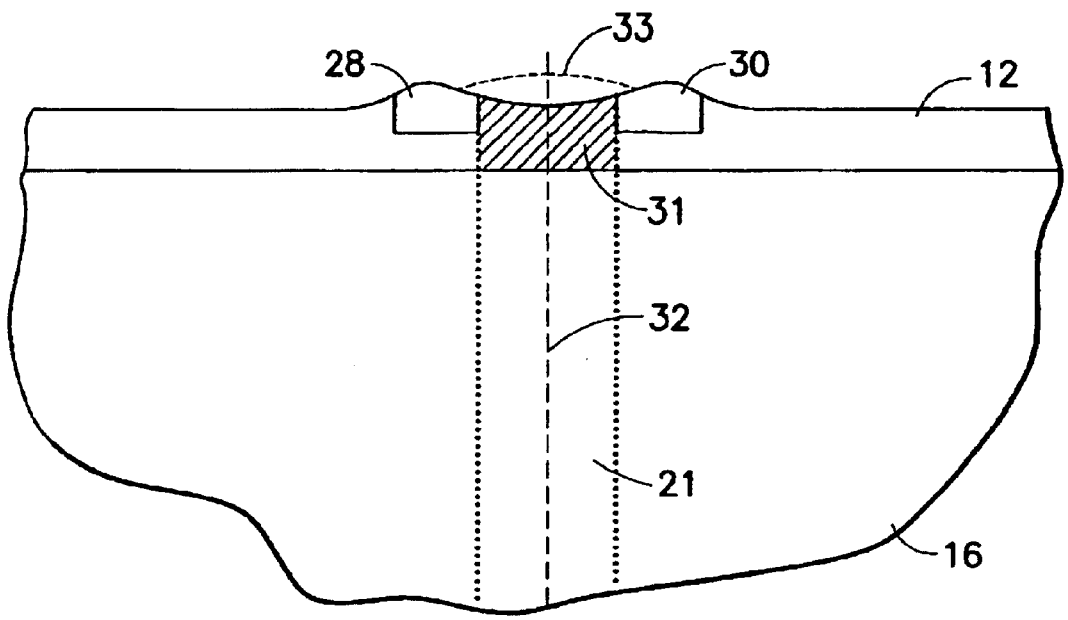
FIG. 6 is a schematic showing a plan view of a portion of a zipper tape that has been stomped using a split ultrasonic horn and heat cross sealed between the split ultrasonic seals in accordance with one embodiment of the method of the invention. Again the dashed line indicates where the assembly will be cut to form separate packages.
Figure 7:
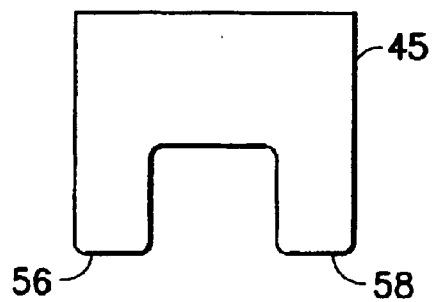
FIG. 7 is a schematic showing an elevational view of a split ultrasonic horn in accordance with one embodiment of the apparatus of the invention.

This aspect of the invention is illustrated in FIG. 6. The stomped regions 28 and 30 in FIG. 6 are formed by ultrasonically deforming the zipper material using a split ultrasonic horn. One example of such a split ultrasonic horn 45 can be seen in FIG. 7. The split ultrasonic horn comprises two prongs or arms 56 and 58 that project from the main body of the horn and have coplanar end faces. The prongs 56 and 58 are generally parallel to a centerline of the split horn 45, while the end faces of the prongs 56 and 58 are generally perpendicular to that centerline.

The structure of one embodiment of a split ultrasonic horn is shown in more detail in FIG. 8, which depicts the relative positions of a split ultrasonic horn 45, interlocked parts 2 and 4 of a zipper tape, and an anvil 43 at the start of an ultrasonic zipper stomping operation. The components for activating horn 45 are not shown in FIG. 8, but can be easily gleaned by a person skilled in the art with reference to FIG. 4. The horn and anvil of the ultrasonic welding apparatus disclosed herein are specifically designed so that the ultrasonic stomping operation accomplishes at least some of the following goals: create a vertical hump on the zipper to stop the slider; preserve the base of the zipper profile to resist pull-off of the slider; penetrate the heat into the mass of the zipper profile in the end stop areas and melt the hooks of the zipper profiles to each other and into the base, prevent the zipper from opening or shifting during stomping; direct the flow of the molten plastic upward toward the hump-stop at the ends of the stomp; control the heat of the plastic to prevent hot spots that cause holes in the bag and prevent the flange attachment from burning, away from the base of the zipper; and guiding/locating the zipper in the stomper. Various designs in horns and anvils can be tried with matched contours, base guide grooves, holding and energy-directing teeth, a "dam" to control the material flow, heated anvil, etc., all to help shape the end stomp. Special guides and cover plate designs can be developed to guide the profile at the ultrasonic stomp and to direct cooling toward the ends of the stomp. The horn and anvil should be designed to provide end stomps with improved appearance and high end pull-off forces.

Referring to FIG. 8, the ultrasonic welding apparatus in accordance with one embodiment comprises a split horn 45 and an anvil 43, which are brought together with the flexible zipper of a reclosable package therebetween. Only one prong of the split horn is visible in FIG. 8, with the other prong being directly behind it, separated by a gap (shown in FIG. 7). The anvil 43 comprises a slot 49 in which a portion of one zipper half, e.g., zipper half 2 having a male profile, is inserted, while each prong of the split horn 45 comprises one or more teeth 114 (if more than one, the teeth are arranged in a row extending into the paper as seen in FIG. 8), which penetrate (above the rail 90) into the mass of thermoplastic material forming the zipper half 4 having a female profile. Although placing the zipper half with the female next to the horn is preferred, this is not mandatory. During the ultrasonic stomping procedure, the split horn 45 is displaced downward and toward the stationary anvil 43. FIG. 8 shows the split horn 45 in a position whereat the tooth 114 has recently come into contact with the zipper half 4. The split horn is activated to couple ultrasonic waves into the zipper material while applying pressure. As a result, portions of the zipper halves 2 and 4 will be deformed and flattened, with indentations being formed in the flattened thermoplastic material by the teeth. The portion of the zipper halves that is flattened is determined by the extent of the flattening surface 116 on each prong of the split horn 45. As seen in FIG. 8, no flattening will occur in the rails 88 and 90 of the zipper during the ultrasonic stomping operation. Preferably, the boundary 72 of the horn prongs is generally aligned with the left-hand (as seen in FIG. 8) wall of the slot 49 in the anvil 43. Each prong of the split horn 45 further comprises a beveled surface 74 having a juncture with wall 72 and a juncture with the flattening surface 116.

An additional structural feature seen in FIG. 8 is a rail 118 that projects downward of the flattening surface 116 on each prong of the split horn. Each rail 118 serves as a dam for blocking and deflecting the flow of thermoplastic material across the flattening surface during the ultrasonic stomping operation. The confronting wall of the dam 118 is represented by a dashed line in FIG. 8 because it is hidden behind a side rail 120 from the vantage shown in FIG. 8.

Referring again to FIG. 6, the ultrasonically deformed areas on the zipper are indicated by reference numerals 28 and 30. Although the flattening surface 116 of the split horn 45 will cause the thermoplastic zipper material to flow in all directions, the angled structure of the energy-directing teeth on each prong of the split horn causes the molten zipper material to flow predominantly upward, resulting in the formation of the humps at the top of stomped regions 28 and 30, as seen in FIG. 6.

The next step after the ultrasonic stomping operation is conduction heat sealing to form a cross seal 21, the boundaries of the cross seal being indicated by dotted lines in FIG. 6. During this cross sealing operation, heat and pressure are applied using a pair of opposing vertical bars 34 and 36, shown in FIG. 9. The zipper material in the hatched region 31 in FIG. 6 is flattened between the vertical heat sealing bars. Again molten thermoplastic zipper material flows upward. The curved dotted line 33 indicates one possible profile for the upper edge of the displaced zipper material. In this manner, the space between the ultrasonically sculpted humps 28 and 30 can be filled in with more thermoplastic zipper material. The conduction heat-sealed material fuses with the ultrasonically stomped material, thereby stiffening the stomped humps 28, 30 and increasing their resistance to folding.

After conduction heat sealing, the cross seal 21 is cut down the middle. The line of cutting 32 is indicated by a dashed line in FIG. 6. The crushed T-shaped region of the zipper is divided into respective slider end stops that are mirror images of each other, while the vertical strip of heat sealed packaging film is divided into respective side seals for the separate packages.

Figure 9:
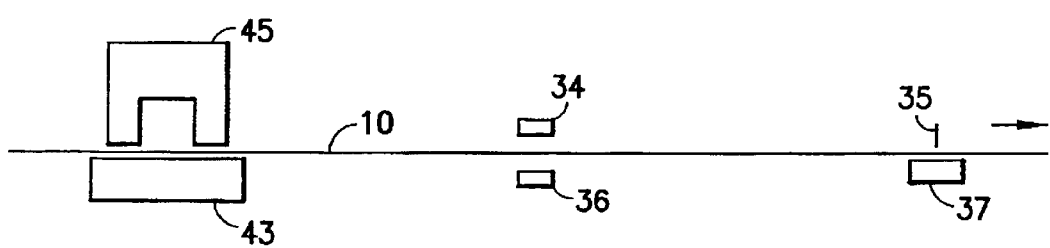
FIG. 9 is a schematic showing a series of stations along a production line designed in accordance with one embodiment of the invention.

At the stage when the slider end stops are formed, the zipper can be joined to both wall panels of packaging film or only one wall panel. Typically, the zipper tape is placed between the walls of the folded packaging film and is heat sealed to the package walls by a pair of horizontal conduction heat sealing bars. After this sealing operation, the packaging film is advanced one or more package increment (i.e., one or more package widths). Referring to FIG. 9, the zipper tape is then stomped at a stomping station comprising the horn 45 and anvil 43 previously described. After ultrasonic stomping, the packaging film is again advanced one or more package increments. Then at a second sealing station, the folded film and zipper tape are cross-sealed by a pair of vertical sealing bars 34, 36 to form discrete receptacles. Then the packaging film is again advanced one or more package increments. At a cutting station, the individual packages are severed from one another by cutting along a mid-line of the cross seal. This can be accomplished, for example, using a blade 35 to cut the plastic and a backing plate to support the plastic film during cutting. Each separated package is then ready to be filled. Alternatively, the packages can be filled before cutting.

Optionally, the method of manufacture further comprises the step of pre-heating at least one of the zipper parts prior to the ultrasonic stomping operation and/or the step of directing cooling fluid toward an extension flange of at least one of the zipper parts during the ultrasonic stomping operation.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "package" means a container, bag, pouch or other receptacle for objects, material or stuff. A container, bag, pouch or other receptacle is deemed to be a package even if not yet packed with objects, material or stuff. As used in the claims, the verb "joined" means fused, welded, bonded, sealed, adhered, etc., whether by application of heat and/or pressure, application of ultrasonic energy, application of a layer of adhesive material or bonding agent, interposition of an adhesive or bonding strip, co-extrusion (e.g., of zipper and bag), etc.

What is claimed is:

1. A system comprising an ultrasonic welding assembly comprising a horn and an anvil, wherein said horn comprises two prongs separated by a gap, each of said prongs comprising an end surface confronting said anvil, each of said end surfaces having at least a portion that is flat, said flat portions being generally coplanar, and further comprising a flexible zipper comprising first and second zipper strips made of thermoplastic material, said first and second zipper strips comprising respective closure elements that have mating profiles, wherein respective portions of said zipper lie between said respective prongs and said anvil, with a connecting portion of said zipper spanning said gap.

2. The system as recited in claim 1, wherein each of said prongs further comprises a respective rail projecting forward of said respective end surface, said rail being shaped to serve as a dam for flowing thermoplastic material.

3. The system as recited in claim 2, wherein each of said prongs further comprises an energy director designed to direct ultrasonic energy into a mass of thermoplastic material and deflect flowing thermoplastic material of said mass toward said dam.

4. A system for forming slider end stops on a zipper tape that comprises first and second interlockable zipper parts, comprising:

an ultrasonic welding apparatus configured to transmit sufficient ultrasonic wave energy into first and second areas of said zipper tape to cause said first and second interlocked zipper parts to deform and fuse in said first and second areas, said first and second areas being separated by a gap; and a conduction heat sealing apparatus configured to apply sufficient heat and pressure onto a third area of said zipper tape to cause said interlocked zipper parts to deform and fuse in said third area, at least part of said third area being located between said first and second areas in said gap.

5. The system as recited in claim 4, wherein said conduction heat sealing apparatus is also configured to apply sufficient heat and pressure onto a fourth area to form a seal that extends generally transverse to a lengthwise direction of said zipper tape, wherein said third and fourth areas are contiguous.

6. The system as recited in claim 5, further comprising means for cutting said zipper tape along a line that passes through said third and fourth areas, but not said first and second areas.

7. The system as recited in claim 6, wherein said cutting line substantially bisects said third and fourth areas.

8. The system as recited in claim 4, wherein said ultrasonic welding apparatus comprises a horn and an anvil, said horn comprising two prongs separated by a gap, each of said prongs comprising an end surface confronting said anvil, each of said end surfaces having at least a portion that is flat, said flat portions being generally coplanar.

9. The system as recited in claim 4, wherein said conduction heat sealing apparatus comprises a pair of mutually aligned and opposing sealing bars situated on opposing sides of said zipper tape.

10. The system as recited in claim 5, wherein a center of said ultrasonic welding apparatus and a center of said conduction heat sealing apparatus are separated by a distance equal to a width of a package.

11. The system as recited in claim 6, wherein a center of said ultrasonic welding apparatus, a center of said conduction heat sealing apparatus and said cutting means are spaced at increments equal to a width of a package.

12. An apparatus for forming packages having slider-operated zippers, comprising first and second stations having respective registration points spaced at a distance equal to one or more package widths along a machine direction, wherein:

said first station comprises an ultrasonic welding apparatus configured to ultrasonically stomp a zipper tape in first and second areas spaced in said machine direction, said first and second areas being separated by a gap; and said second station comprises conduction heat sealing apparatus configured to heat seal packaging film material in a third area that lies at least partly in said gap between said first and second areas and includes a contiguous strip that extends generally transverse to said machine direction, a portion of said zipper tape within said third area being deformed and portions of said packaging film material within said third area being joined to form a seal having a predetermined width.

13. The apparatus as recited in claim 12, further comprising a third station having a registration point spaced at a distance equal to one or more package widths along said machine direction from said registration point of said second station, wherein said third station comprises a cutting device for cutting said zipper tape and said packaging film material along a straight line intersecting and dividing said third area to separate a package.

14. The apparatus as recited in claim 12, wherein said ultrasonic welding apparatus comprises a horn and an anvil, said horn comprising two prongs separated by a gap, each of said prongs comprising an end surface confronting said anvil, each of said end surfaces having at least a portion that is flat, said flat portions being generally coplanar.

15. The apparatus as recited in claim 12, wherein said conduction heat sealing apparatus comprises a pair of mutually aligned and opposing sealing bars situated on opposing sides of said zipper tape and said packaging film material.

* * * * *